United States Patent [19]

Gebhard et al.

[11] Patent Number: 4,710,365

[45] Date of Patent: Dec. 1, 1987

[54] PROCESS FOR THE DRY REMOVAL OF SULFUR DIOXIDE FROM FLUE GAS

[75] Inventors: Georg R. U. Gebhard, Reichshof; Klaus R. G. Hein, Bergheim-Ahe; Wolfgang Glaser, Frechen, all of Fed. Rep. of Germany

[73] Assignee: Rheinisch-Westfalisches Elektrizitatswerk Aktiengesellschaft, Essen, Fed. Rep. of Germany

[21] Appl. No.: 764,844

[22] Filed: Aug. 9, 1985

Related U.S. Application Data

[62] Division of Ser. No. 526,904, Aug. 26, 1983, abandoned.

[30] Foreign Application Priority Data

Aug. 28, 1982 [DE] Fed. Rep. of Germany ....... 3232080

[51] Int. Cl.$^4$ .......................... C01B 17/00; B01J 8/00
[52] U.S. Cl. ..................................... 423/244; 110/343; 110/345; 423/242

[58] Field of Search .......... 423/242 A, 242 R, 244 A, 423/244 R; 110/343, 345

[56] References Cited

U.S. PATENT DOCUMENTS

| | | | |
|---|---|---|---|
| 4,178,349 | 12/1979 | Wienert | 423/244 |
| 4,309,393 | 1/1982 | Nguyen | 423/244 |
| 4,329,324 | 5/1982 | Jones | 423/244 |
| 4,387,078 | 6/1983 | Lin | 423/244 |
| 4,397,742 | 8/1983 | Minnick | 423/244 |

FOREIGN PATENT DOCUMENTS

2002030 2/1979 United Kingdom ................ 423/244

*Primary Examiner*—Gregory A. Heller
*Attorney, Agent, or Firm*—Karl F. Ross; Herbert Dubno

[57] ABSTRACT

A dry process for desulfurization of a power plant flue gas recovers, e.g. from an electrostatic precipitator, the solids which include unreacted absorbent, absorption reaction product and fly ash, and recycles at least part of this recovered solid product to contact with the flue gas for further absorption.

1 Claim, 1 Drawing Figure

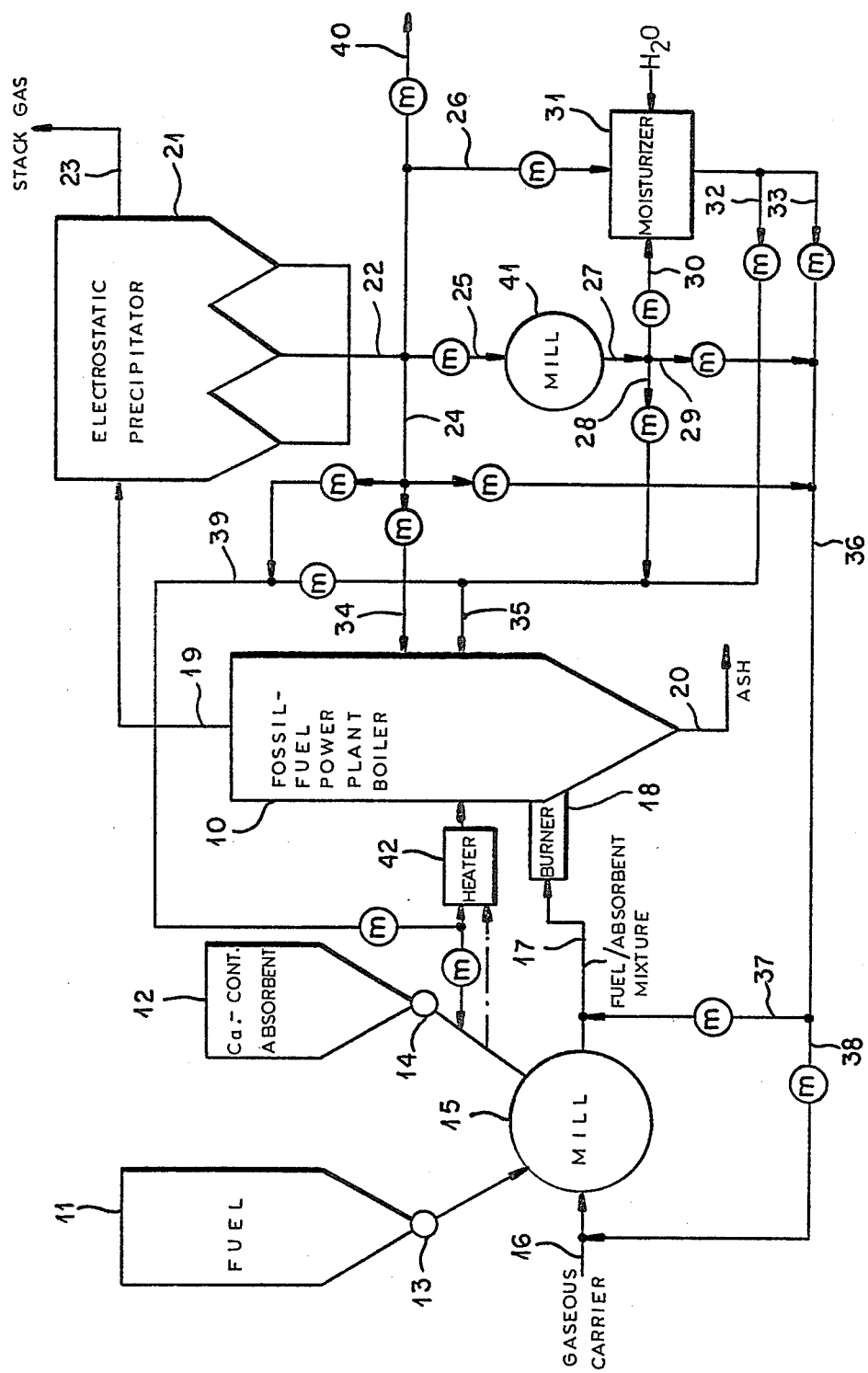

PROCESS FOR THE DRY REMOVAL OF SULFUR DIOXIDE FROM FLUE GAS

This application is a division of application Ser. No. 526,904 filed Aug. 26, 1983, now abandoned.

CROSS REFERENCE TO RELATED APPLICATIONS

This application is related to the commonly assigned copending applications Ser. No. 526,903 based upon German application P No. 32 32 077.9; Ser. No. 526,907 based upon German application P No. 32 32 081.7; Ser. No. 526,886 based upon German application No. P 32 32 079.5; and Ser. No. 526,910 based upon German application No. P 32 32 078.7; all of these German applications have been filed Aug. 28, 1982 and all of the U.S. applications being filed concurrently with Ser. No. 526,904, the parent case of the present divisional application.

FIELD OF THE INVENTION

The present invention relates to a process for the dry removal of sulfur dioxide and other toxic and noxious components from the flue gases of fossil-fuel boilers, especially fossil-fuel power plant combustion. More particularly, the invention relates to a process wherein a fuel or a flue gas is treated with a finely divided absorbent which is capable of reacting with the sulfur dioxide or other toxic or noxious components and this particulate substance, in the form of the reaction product, is removed from the gas stream in a dry form by a particle separating means.

BACKGROUND OF THE INVENTION

Particulate absorbents for the dry desulfurization, i.e. removal of sulfur dioxide and other toxic and noxious components from flue gases of power plant or other fossil-fuel combustion, generally comprise one or more finely divided inorganic alkaline-earth compounds, especially calcium and/or magnesium compounds and usually compounds in the form of the oxides, hydroxides or carbonates of these alkaline-earth metals.

The preferred absorbent is usually calcium carbonate.

In the prior art process of the aforedescribed type, the absorbent can be provided with an additive to promote its reactivity and where fossil-fuel combustion is referred to, we intend to include all fossil fuels, especially the solid and liquid fossil fuels and, most particularly, solid fossil fuels of low rank, e.g. brown coal (see German Patent DE-PS No. 28 07 076 and the corresponding U.S. Pat. No. 4,262,610, commonly assigned herewith).

The dry-recovered solid, consisting of the reaction product of the absorbent and the toxic components of the flue gas, other solids which may be removed by the gas/solids separator, and residual absorbent, generally was discarded (e.g. by deposit in waste disposal sites), or subjected to other uses unassociated with the desulfurization operation.

These systems had the disadvantage, therefore, that the consumption of the absorbent was high, especially since the desulfurization process was of limited efficiency.

For example, it was noted that on purely chemical and stoichiometric terms, the absorbent was capable of removing more of the sulfur containing compounds and other toxic and noxious components by chemical reaction therewith, than was actually removed.

OBJECTS OF THE INVENTION It is, therefore, the principal object of the present invention to provide a process for the dry desulfurization of flue gases, especially the flue gases of fossil-fuel combustion and most specifically the flue gases from fossil-fuel power plant combustion chambers, whereby the efficiency of desulfurization and the removal of other toxic and noxious components is increased.

Another object of the invention is to increase the utilization of absorbents of the type described.

Still another object of the invention is to reduce the consumption of absorbent required for the desulfurization of flue gases and therefore to reduce the problem of dealing with the products obtained from such desulfurization.

SUMMARY OF THE INVENTION

These objects and others which will become apparent hereinafter are obtained, in accordance with the present invention, in a method of desulfurizing flue gases, especially the flue gases of fossil-fuel combustion and particularly the flue gases of low rank coal combustion, which comprises treating the flue gases with a finely divided absorbent of the type described, separating in dry form the particulates from the flue gases and recycling in whole or in part the recovered solids, as a portion of the absorbent, to the flue gas.

The recycled solids, of course, contain unreacted absorbent which contributes to the absorption process and, indeed, has been found to promote the absorption process so that the overall utilization of the absorbent is improved.

Whenever, in the present case, the addition of particulate solids, either as virgin absorbent or as recycled absorbent and associated solids, is described, the addition of these particles can be to the fuel in the manner described in the aforementioned patent, to the combustion chamber or burner to which the fuel is supplied, to passages traversed by the flue gas or, indeed, to any point in the process at which the flue gas can come into intimate contact with the particles.

The finely divided recycled absorbent can be used with or without admixture of virgin absorbent therewith.

The recovered solids consist mainly of unreacted absorbent, solid absorption or reaction product and fly ash.

The invention is based upon our surprising discovery that the recovered solids by themselves are extremely effective as an absorbent in spite of the fact that they are partly reacted and in spite of the fact that they contain a large proportion of fly ash. Indeed, either the partial reaction product or the fly ash may promote the activity of the remainder of the absorbent because the recycled solids are an extremely efficient absorbent for sulfur dioxide and other toxic and noxious components of the flue gas.

This solid product, therefore, can be contrasted with the virgin or primary absorbent by being described as a secondary absorbent. It is also possible that the fly ash components acts as an absorbent for some of the toxic and noxious components, thereby contributing to the efficiency of the recycled solids as an absorbent.

We have found, moreover, that it is possible to improve the absorption capabilities of the recycled solids by humidifying them, i.e. treating them with water or steam before recycling these solids to the fuel and/or flue gases. The best mode embodiment of the invention, therefore, involves a full treatment of all or a partial treatment of all or some of the recycled solids with water or steam.

We have found, moreover, that the absorption capabilities can be improved when all or part of the recycled solids are milled before being added to the fuel and/or returned to the flue gas.

In general the recovered solids are recycled at least once to the absorption process and are recycled with or without addition of virgin absorbent. Preferably, however, the recycling is effected a plurality of times with addition of virgin absorbent when the absorption capability tends to fall.

A portion of the recovered solids can, e.g. with treatment in the manner described, be continuously recycled while the balance is replaced by virgin absorbent.

In the embodiment in which the absorbent is injected into the flue gases directly, the present invention provides that the recycled solids, if desired together with virgin absorbent, is introduced at a temperature of 100° to 1100°, preferably from 100° to 700° C. into the flue gas.

In the latter case especially but even in general, we have found it to be advantageous to supply the virgin absorbent in the form of an alkaline earth carbonate or hydroxide.

In another embodiment of the invention, the virgin absorbent and the recycled solids are combined with the fuel prior to combustion. When the carbonates and hydroxides are used as the absorbent, the combustion process or the reaction in the flue gases generates from the carbonates and hydroxides, the corresponding oxide. The reaction capabilities of the oxides are less than those of the carbonates and still less than those of the hydroxides. Consequently, the treatment of the recovered solids in the aforedescribed play with water and/or steam (water vapor) tends to transform any alkaline earth oxides into the more effective alkaline earth hydroxides.

The treatment of the recovered solids with water or steam is also advantageous because the hydroxide formation step is exothermic and contributes to raising the temperature of the solids before they are returned to the reaction system. This, of course, also increases the reactivity of the recycled solids as an adsorbent.

The heating of the recycled solids also tends to reduce the thermal losses from the flue gases when the absorbent interacts with the flue gases.

The treatment of the solids with water or steam can be effected by simply spraying the solids with water or blowing steam through the solids.

The treatment with water can be combined with the milling step, i.e. water or steam can be introduced into the mill.

The milling which is carried out in accordance with the invention can be any type of disintegration or comminution, preferably utilizing hammer or pin mills or the like.

It appears that in the absorption process, the absorbent interacts with the sulfur dioxide and other toxic and noxious components primarily superficially and the superficial reaction product prevents access of the inner core of the absorbent to additional quantities of sulfur dioxide and other toxic and noxious components.

By comminution in the manner described, the outer shell of reacted products is broken up and the core material made more accessible, thereby improving the absorption activity.

When we refer to milling herein as a method of treating the recycled product we intend to include not only bulk handling of the recycled product by the comminution techniques described, but even abrasive action particle by particle as can be achieved, for example, in an oscillating sieve or shaker.

It has been found to be advantageous, moreover, to mix the product to be treated by milling with the fuel before the mixture is introduced into a coal milling apparatus so that the fuel and the absorbent are milled and homogenized together. This additional milling of the product in combination with the coal has been found to further improve the activity and, indeed, we may operate exclusively utilizing the joint milling of the recycled absorbent and the coal or a preliminary milling of the absorbent, followed by a joint milling of the absorbent and the coal.

Here again the chemical treatment, e.g. the reaction with water or water vapor, can be carried out concurrently with the milling techniques, i.e. within one or both of the mills.

The advantages of the present invention will be immediately apparent, since the efficiency of the desulfurization is improved in terms of the unit weight or volume of virgin absorbent which must be employed. In addition, the handling of recovered solids which may otherwise have to be discarded, is reduced. Finally, the solids which are obtained, having a high concentration of calcium sulfate and fly ash, have been found to be especially effective for use as building material or in building material compositions as described in the aforementioned copending applications. The recycled absorbent has also been found to be especially effective for the recovery not only of sulfur dioxide but also other components such as fluorine and chlorine and compounds thereof, which are also desirably removed from the flue gas.

In order to place the invention in perspective, the technology of desulfurization can be briefly addressed. There are a number of processes known for the cleaning of a fuel gas of a fossil-fired power plant combustion chamber or boiler. In the two main processes absorbents in the form of alkaline earth or alkaline metal compounds are used because these absorbents react with the sulfur dioxide and other toxic and noxious components of the flue gas. These processes can be divided into the wet and the dry processes.

In the wet process, the gas is scrubbed with a liquid, generally an aqueous liquid, in which the absorbent is in solution or suspension.

In the dry process, however, the finely divided absorbent is introduced into the flue gas or into the fuel, for example coal, so that absorption can commence immediately upon formation of the combustion products or thereafter.

The wet processes have the disadvantage of high investment costs and maintenance of the apparatus, and the disadvantage that the flue gas is rapidly quenched or cooled so that reheating is necessary if components of the flue gas are to be used elsewhere.

The wet process does, however, have the advantage of comparatively high efficiency. The dry process, while free from the aforementioned disadvantages of the wet process, with a single pass of the absorbent, has an efficiency substantially less than that of the wet process. The reduced efficiency is in part a result of the reduced intimacy of contact of the absorbent with the gas and the shorter residence time of the absorbent in contact with the gas.

In the past, this limitation in efficiency has been tolerated because of the low costs of maintenance and capital expenditure, although the need for additional absorbents introduced an important cost factor here too. Furthermore, care had to be taken, especially when the absorbent was introduced into the fuel, not to overload the capacity of the system because of the need to heat up the absorbent as well.

With the system of the invention, we are able to achieve efficiencies closer to those of wet scrubbing processes while maintaining the advantages of the dry process and nevertheless markedly reducing the cost.

BRIEF DESCRIPTION OF THE DRAWING

The sole FIGURE of the drawing is a flow diagram illustrating the invention.

SPECIFIC DESCRIPTION

In the drawing, we have shown a supply hopper 11 for the fuel, e.g. a low rank brown coal, which is fed by a metering device 13 to a mill 15. A virgin absorbent, e.g. a calcium-containing compound such as calcium carbonate, is fed from a hopper 12 through a metering device 14 to the mill 15 which is also supplied with a carrier gas 16, e.g. flue gas, combustion air or some other gas.

Within the mill, utilizing the principles described in the aforementioned patent, a homogeneous mixture of fuel and absorbent is formed, this mixture being entrained by the carrier gas into the burner 18 via a line 17. The burner 18 opens into a fossil-fuel power plant boiler 10 which generates steam for driving the steam turbines of the power plant in any conventional manner.

Ash which is not entrained by the flue gases is discharged at 20 from the boiler while the flue gases entraining fly ash and the finely divided absorbent, at least partly reacted, is carried off at 19 and supplied to an electrostatic precipitator 21 which represents a solid/gas separator.

The cleaned flue gas is discharged as stack gas at 23 while the recovered solids at 22 can be partly discharged at 40, if replaced by an appropriate portion of virgin absorbent from the hopper 12, or entirely recycled.

According to the invention and as represented by line 24, the recovered solids can be fed directly at 34 to the flue gases in the boiler or as shown at 36, fed either to the mill 15 for comminution with the coal and virgin absorbent, or at 37 to the fuel/absorbent mixture entering the burner 18.

Alternatively, a portion of this recycled product can be fed at 39 to enter the mill 15 with the virgin absorbent.

Alternatively or in addition, depending upon the mode of operation of the apparatus, the recovered solids can be fed at 25 to a mill 41 to effect comminution and thus activity enhancement of the solids before they are discharged at 27 and fed via lines 28 and 35 to the flue gases directly or via lines 28 and 39 to admixture with virgin absorbent, or via lines 29, 36 and 37 or 38 to the fuel/virgin absorbent mixture delivered to the burner.

As represented at line 30, a portion of the milled product or all of it may be delivered to a moisturizing unit 31 in which the solids are treated with water or steam.

Since noncomminuted recovered solids may be treated with water as well, a line 26 has been provided for this purpose.

The moisture treated solids are fed at line 32 to the flue gases or to admixture with the virgin absorbent or at line 33 for delivery to the fuel supply system of the boiler.

Metering units m are provided to determine the rates of flow of the solids along the various lines.

In addition, we may provide a heater 42 for heating the solid particles before they are recycled to the flue gas and for heating absorbent particles (virgin absorbent) before these introduced into the flue gas if they are added to the flue gas directly.

SPECIFIC EXAMPLES

Invention is described with reference to three examples represented on the table provided below.

For the dry desulfurization of a flue gas from a power plant combustion of brown coal in the manner described in the aforementioned patent, utilizing electrostatic precipitator recovery of the solids, we recycled the recovered solids without treatment (absorbent 1), a ground electrostatically recovered solid (absorbent 2) and an absorbent 3 consisting of the recovered solids which were milled and treated with water.

With simple recycling, we were able to achieve a 53.6% desulfurization without the addition of any virgin absorbent and could improve on this by about 12% simply by milling the recycled product and by about 20% utilizing a combination of milling and treatment with water. It should be apparent that the utilization of the absorbent is thereby greatly increased.

|  | Flue gas composition | | | Degree of desulfurization (%) |
| --- | --- | --- | --- | --- |
|  | $SO_2$ mg/m$^3$ | $CO_2$ Vol. % | $O_2$ Vol. % | |
| without absorbent | 7120 | 14.8 | 5.0 | — |
| Absorbent 1:2% by weight of recycled solids in terms of calcium added to the fuel | 3260 | 14.6 | 5.2 | 53.6 |
| without absorbent | 7460 | 14.0 | 5.8 | — |
| Absorbent 2:2% by weight of recycled solids in terms of calcium added to the fuel | 2960 | 14.1 | 5.7 | 60.5 |
| without absorbent | 7290 | 13.8 | 6.0 | — |
| Absorbent 3:2% by weight of recycled solids in terms of calcium added to the fuel | 2655 | 14.2 | 5.6 | 64.6 |

We claim:

1. A process for the dry removal of sulfur dioxide from a fossil-fuel flue gas containing same together with fly ash, consisting essentially of the steps of:

(a) treating the flue gas with a finely divided particulate capable of reacting with said sulfur dioxide by directly contacting said gas with said particulate in a dry state said particulate being a calcium or magnesium compound selected from the group consisting of the oxides, hydroxides, carbonates and mixtures thereof;

(b) dry separating particles from said flue gas to form a mass of dry recovered solids containing fly ash, unreacted particulate and reaction products of said particulate with said sulfur dioxide;
(c) dry milling said recovered solids;
(d) treating said recovered solids with liquid water or water vapor;
(e) continuously recycling at least part of the milled recovered solids after the treatment thereof with liquid water or water vapor, to contact with said flue gas for further absorption of said sulfur dioxide from said flue gas by said recovered solids by mixing the recovered solids with coal and milling the resulting mixture and thereby feeding the mixture into a burner in a combustion chamber in which said flue gas is produced; and
(f) continuously adding to the recycled milled recovered solids from the treatment thereof with liquid water or water vapor a quantity of said compound.

* * * * *